United States Patent [19]

Faroudja

[11] Patent Number: 5,029,997
[45] Date of Patent: Jul. 9, 1991

[54] STOP-FRAME ANIMATION SYSTEM

[76] Inventor: Philippe Y. C. Faroudja, 26595 Anacapa Dr., Los Altos Hills, Calif. 94022

[21] Appl. No.: 438,332

[22] Filed: Nov. 16, 1989

[51] Int. Cl.$^5$ ............................................ G03B 19/18
[52] U.S. Cl. ...................................... 352/54; 352/50; 352/51; 352/52; 352/87
[58] Field of Search ....................... 352/50, 51, 52, 54, 352/87

[56] References Cited

U.S. PATENT DOCUMENTS

| | | | |
|---|---|---|---|
| 2,091,144 | 8/1937 | Freil | 352/52 |
| 2,241,929 | 5/1941 | Kendig | 352/54 |
| 2,358,530 | 9/1944 | Nassour | |
| 2,599,624 | 6/1952 | Gillette | |
| 3,081,667 | 3/1963 | Goto | |
| 3,970,379 | 7/1976 | Fedder | |
| 4,600,919 | 7/1986 | Stern | |

OTHER PUBLICATIONS

*International Photographer,* "Making Puppetoons", by Kreva Marcus, Aug. 1942, pp. 1–40.

Primary Examiner—Monroe H. Hayes
Attorney, Agent, or Firm—Janet K. Castaneda; David B. Harrison

[57] ABSTRACT

An stop motion animation sequence of a tangible object is made by the steps of making a series of drawings representing three-dimensional object to be animated in various sequential positions; sequentially embodying the drawings on a projection medium such as motion picture film or video; displaying the projection medium at real time to see if the motion depicted by the drawings is the desired motion; and repeating the foregoing steps until the desired motion is realized. Once the drawings depicting the desired motion are completed, transferring each drawing onto a transparent material such as celluloid (commonly used in animated cartoons) so that an identical series of drawings representing the object in the various sequential positions thereby exists on the transparencies. The transparencies are then sequentially attached in the same location to a stationary indexing jig located between the three-dimensional object to be animated and a viewer or camera such that both the transparency and the object can simultaneously be seen by the viewer or camera. The object is then posed in confirmity with the drawing on the transparency as seen through the viewer or camera; and the object is then photographed in its posed position on a stop frame basis. The next transparency in sequence is then used to reposition the object for the next stop frame and this process of repositioning and stop frame imaging continues until the sequence is complete, thereby yielding a finished stop frame work for projection/display purposes.

12 Claims, 5 Drawing Sheets

STOP-FRAME ANIMATION SYSTEM

FIELD OF THE INVENTION

This invention relates to the production of motion pictures of three-dimensional animated objects such as puppets, dolls, clay figures, etc., in which the three dimensional animated objects are sequentially photographed frame by frame and in which the completed film of the three dimensional animated objects is projected at a normal frame rate giving the objects the illusion of life. This field of motion-picture making is commonly termed "stop-motion animation."

BACKGROUND OF THE INVENTION

In a usual production utilizing stop-motion animation, the producers determine the position of the animated three dimensional object in each film frame usually by intuition. As it is nearly always impossible when producing stop motion animation to know, for example, precisely how much a figure's arm has moved in the last frame photographed and needs to move in the next, the producer must rely on his sixth sense to make the adjustment. This production method has a great disadvantage as the resulting movement of the three-dimensional figure or object in the final film produced looks slightly snappy or jerky, and lacks smoothness and realism. This jerkiness and lack of realism is present in virtually all films produced using stop-motion animation, even in films produced by those highly skilled in the art, and remains today the outstanding problem associated with stop-motion animation. The present invention is concerned with eliminating this problem.

Attempts have been made in the past to develop several techniques and inventions in order to eliminate such jerky movement and to impart instead greater realism to the production of stopmotion animation. All such prior techniques, however, have inherent disadvantages, which will be discussed.

One prior approach, disclosed in U.S. Pat. No. 2,241,929, utilizes an arrangement of steps including first making a series of drawings representing the object to be animated in various sequential positions, producing a film strip from the resultant drawing series, sequentially projecting the film strip frames onto a screen, sequentially posing the object in conformity with the projected screen image that is behind the object, and finally, sequentially photographing the object in its posed positions for the production of a finished film.

This prior method allowed the producers of the stop-motion animated film a degree of planning with regard to the object to be animated. However, the technique had a disadvantage in that at best one could only match the outline of the object to the projected image on the screen (in this technique's most precise form, one matches the object's shadow cast on the screen to the projected film image on the screen); it is thus impossible to determine the required location of those portions of the object within the object's outline. For example, in the case of a humanlike doll seen walking in profile in a position in which its arm is within its body's outline, and does not extend from the body, it would be impossible to determine the exact location of the arm in this posed position. Therefore, this technique lacks precision. Another technique in this patent calls for alignment of interior features by projecting the animation frame directly onto the puppet. Such a technique is imprecise because of the difficulty in determining the precise point at which a line begins and ends. In addition, all lines of a frame may not be projected on the unposed puppet, for example the succeeding frame may contain an extended arm with portions oriented considerable higher than the present position of the posed puppets arm. Furthermore, some of the projected lines may be out of focus on the 3-dimensional puppet.

Another technique, disclosed in U.S. Pat. No. 2,358,530, utilized an alignment grid composed of a series of squares. This grid was in close proximity to the puppet or object to be animated in the usually (stop-motion fashion. After posing the puppet in one position, one noted the positions of the arms, legs, etc., onto the grid, and then utilized these grid notations for reference while posing the doll in the next position, repeating this process throughout the film's production. The disadvantage of this prior technique is, firstly, that it allows no extensive preplanning of the puppet's posed positions such as in the prior technique previously discussed, because one is noting positions only after they have been set. Secondly, the technique allows one to note only the positions of those portions of the body which are on the outline of the body, and not within. This approach results in the same problem which existed in the technique previously discussed: lack of precision.

Another prior art technique, disclosed in U.S. Pat. No. 2,599,624, made use of a similar type of alignment grid. Specifically, in this arrangement, two alignment grids were utilized to coordinate the positions of a puppet with a previously filmed sequence of a live actor (which is projected in close proximity to the puppet). The disadvantage of this system is that the movements of the puppets must be based on the movements of what the invention terms "live talent" —that is, the movement of humans or animals. This is limiting to the producer of stop-motion of imaginary creatures, such as dinosaurs or 3-headed dragons, of which no previously filmed "live talent" exists. This is a severe disadvantage as stop-motion animation is very often utilized precisely because it is the only method known in which imaginary creatures can come to life. Also, in this method there is no precise visual superimposition of the object and live actor's respective positions, as a side-by-side comparison requires a subjective, thus approximate, positioning of the puppet.

Another prior art technique, disclosed in U.S. Pat. No. 3,970,379, attempted to impart greater realism to stop-motion animation by sequentially projecting (from above the stage) a film of predetermined indices onto the stage upon which the three dimensional puppets or objects rest, sequentially posing the puppets or objects on the stage in conformity with the projected indices, and sequentially photographing the puppets or objects in their posed positions for the production of a finished film. The disadvantage of this scheme is that while it made the smooth movement of the puppets or objects about the stage possible, it did not provide indices for the movement of animatable portions of the puppets or objects' bodies, such as their arms or legs (it only provided indices for the puppets' or objects' stage movement). As a result, a puppet may move about the stage fairly smoothly but still move its arms, legs, head, etc., in the slightly jerky and unrealistic fashion that is typical of stop-motion animation.

Yet another prior art technique, disclosed in U.S. Pat. No. 3,081,667, attempted to impart greater realism to puppet or doll-films in an especially ingenious way.

Through the utilization of a scheme involving a camera, a projector, and a semi-transparent mirror, one was able to superimpose the position of the puppet that one was animating in the usual frame-by-frame fashion with the image of a living being (such as an actor) that is projected frame-by-frame from a previously photographed motion-picture film. This prior approach no doubt made possible the production of more realistic puppet and doll-films, but the approach has the same severe disadvantage as previously noted with U.S. Pat. No. 2,599,624. As the movement of the puppet or doll is based upon the movement of what the inventor himself terms a "living creature" (the creature being previously photographed onto motion picture film), the invention does not make possible the realistic movement of puppets or dolls which are imaginary creatures, such as dinosaurs or dragons, as no living creature exists upon which one can base the movements. As was the case in the previously discussed technique, this approach severely limits the producer of the stop-motion animated film. Stop-motion animation is often utilized precisely for this purpose, it being the only known method of bringing such imaginary three-dimensional creatures to life. Furthermore, the comparison is done only from one angle (one dimension) and does not allow for camera motions which were not pre-determined during the filming of the "living being" reference, thus depriving the director of a precious element of last minute creativity.

Computer animation techniques are described in U.S. Pat. No. 4,600,919, for example. In that patent key frames were generated and stored, each key frame having a common figure of one or more joints. Each joint is defined by operator-controllable parameters which determine the three-dimensional position, rotational orientation and scale factors of a local coordinate system. A computer generates a plurality of in-between frames from the key frames by interpolating in three dimensions the position, rotational orientation and scale factors of the corresponding joints of the key frames. In one aspect, the operator can control the interpolation process during display of the in-between frame sequence in order to change or modify the motion of a figure limb. This reference relates to computer generated animation, rather than stop frame animation formed by sequentially positioning an object or model.

The disadvantages of the prior art relating to stop frame animation are overcome by the present invention.

SUMMARY OF THE INVENTION WITH OBJECTS

An object of this invention is to provide a new method for more accurately positioning any conceivable three-dimensional subject photographed by stop-motion animation so that the appearance of smooth and realistic motion is created when the film is projected, be the subject a puppet, a doll, a clay figure, a solid and unmalleable object, a living being, or anything else imaginable by the filmmaker.

The production of a stop-motion film utilizing the new method disclosed herein comprises the steps of, first, making a series of drawings representing the three-dimensional object to be animated in various sequential positions; sequentially embodying the drawings on a projection medium such as motion picture film or video; displaying the projection medium at real time to see if the motion depicted by the drawings is the motion desired; and repeating the foregoing steps until the desired motion is realized. Once the drawings depicting the desired motion are completed, transferring each drawing onto a transparent material such as celluloid (commonly used in animated cartoons) so that an identical series of drawings representing the object in the various sequential positions thereby exists on the transparencies. The transparencies are then sequentially attached in the same location to a stationary indexing jig located between the three-dimensional object to be animated and a viewer or camera such that both the transparency and the object can simultaneously be seen by the viewer or camera. The object is then posed in conformity with the drawing on the transparency as seen through the viewer or camera; and the object is then photographed in its posed position on a stop frame basis. The next transparency in sequence is then used to reposition the object for the next stop frame and this process of repositioning and stop frame imaging continues until the sequence is complete, thereby yielding a finished stop frame work for projection purposes.

These and other objects, aspects advantages and features of the present invention will be more fully appreciated by considering the following detailed description of a preferred embodiment presented in conjunction with the accompanying drawings.

DETAILED DESCRIPTION OF A PREFERRED EMBODIMENT

Figure 1:
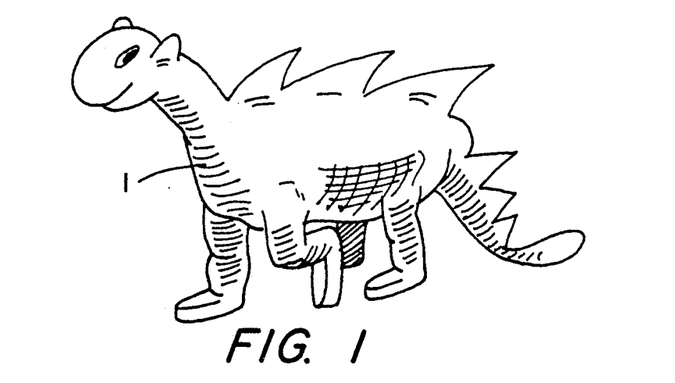
FIG. 1 is a pictorial representation of a puppet or other three-dimensional static object which is to become a character subject in a stop-motion animated film made in accordance with the present invention.

Referring to the drawings, the object for purposes of illustration in FIG. 1 will be described as a fanciful dinosaur puppet designated by the reference character 1. The inanimate three-dimensional puppet has neck, body, tail, and leg joints which may be manipulated and set in order to enable the object 1 to assume different poses, such as sequences of poses assumed when walking. I have chosen a dinosaur as the object in this case to illustrate that the invention makes possible the smooth movement of entirely imaginary, fanciful three dimensional static creatures, such as the dinosaur 1. However, it should be understood that the invention makes possible the smooth movement of not only imaginary creatures and clay figures but also more familiar 3-dimensional objects such as human-like dolls or puppets. My invention makes possible the smooth movement of unmalleable objects that are caused to appear to move by the process of stop-motion animation as well (such as a pencil that is perceived to move across a desk). Living beings can also have their movements described by the invention, (living beings such as humans that move by the process of stopmotion animation as in the work of Canadian film-maker Norman MacLaren). Therefore, it is to be understood that the practice of my invention makes possible the desired appearance of the movement of any conceivable three-dimensional object that can be photographed by stop-motion animation. References hereinafter made to a puppet or object are thus to be understood to cover broadly any conceivable three dimensional, positionable object.

It should also be understood that when reference is hereinafter made to motion picture cameras, it is also intended to cover any picture image capturing and recording device, as a videocamera or computer input device or tablet, that can record the successive positions of an animated object on a frame-by-frame basis and in a manner functionally duplicative of a stop-motion film camera. Given the advances in image recording technology foreseeable in the near future, any storing device that is able, like film or television cameras, similarly to record sequential movements of an object to achieve animation is intended to be embraced and included whenever reference is hereinafter made to motion picture cameras.

Figures 2, 5:
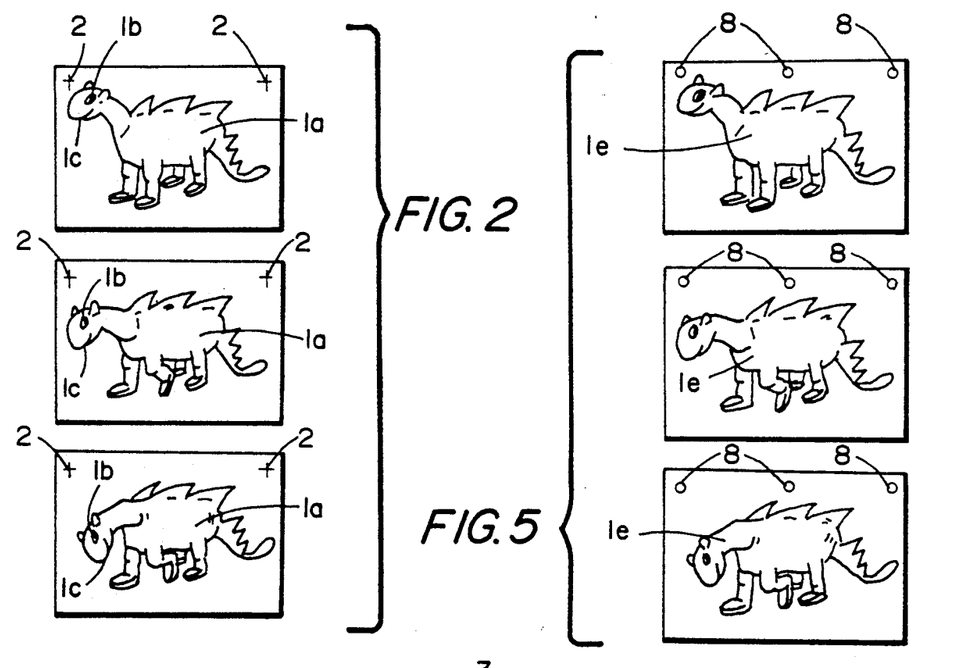
FIG. 2 is a series of drawings on paper showing the FIG. 1 object in various sequential positions.
FIG. 5 is the same series of drawings of the object seen in FIG. 3, identical in shape and size, transferred to transparencies.

Returning to FIG.1, once the puppet 1 has been designed and chosen as a character in the stop-motion animated film to be made, a series of keyframe sketches of the puppet is made on paper drawing sheets, the series of key frame sketches being, for instance, in sequence for illustrating walking movements of the doll 1. The drawing sheets depicting the key frame sketches are seen in FIG. 2. It should be noted that the key frame drawings are not made solely of the outline of the puppet, but also include significant features within the puppet's body such as the puppet's eye 1b and mouth 1c. As stated, FIG. 2 represents the key frame pencil sketches or drawings of the animated puppet in different positions. In-between frames which represent motion transitions between the key frames are now drawn in accordance with the conventional animation techniques in order to produce a sequence of frames which, when viewed sequentially, will convey the desired motion characteristics. The key frames and/or the in-between frames may be generated by pencil sketching or by existing computer graphics methods which enable automatic crafting of the in-between frames in accordance with a priorly established interpolation criteria, as disclosed in the previously discussed U.S. Pat. No. 4,600,919, the disclosure of which is hereby incorporated by reference.

Figure 3:
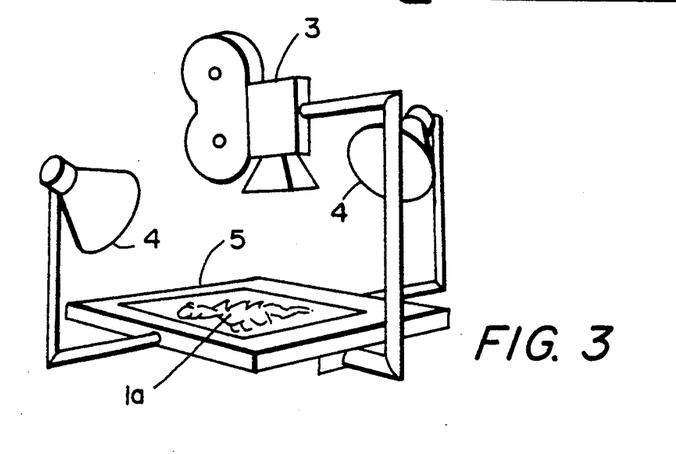
FIG. 3 shows the same series of FIG.2 drawings being sequentially photographed on an animation stand by an animation camera.
Figure 4:
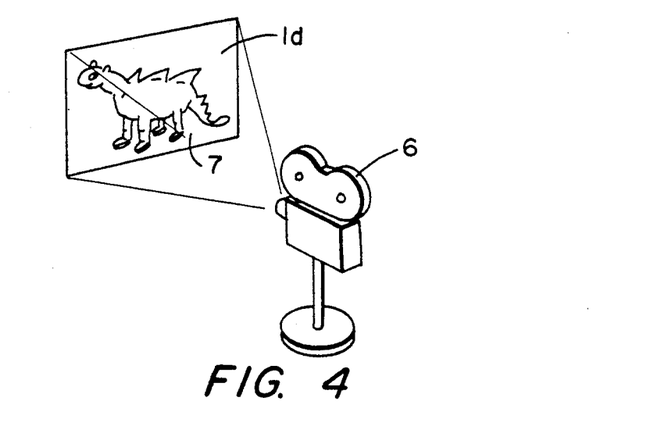
FIG. 4 shows the FIG. 3 film of the sequentially photographed drawings being projected onto a screen.

Once the frame sequence 1a has been recorded onto a storage medium such as paper, the filmmaker then sequentially photographs the frame sequence 1a by recording each frame in order onto a projection medium such as motion picture film. The paper image frames may be supported by an animation stand 5 lit by typical lights 4, and filmed with a stop-frame animation camera 3, all as seen in FIG. 3. Then, as illustrated by FIG. 4, the filmmaker projects the filmed images 1d of the drawings onto a screen 7 with a typical projector 6 at a normal frame rate. The reason all this is done is to check to see if the movements of the puppet 1 as described by the drawing series 1a are as intended by the filmmaker and have the desired visual motion effect. Alternatively, electronic preview techniques may be employed to generate electronically a display on a display screen of frame sequences stored in an animation computer. One of the advantages of this system (and of the invention as a whole) is that if the observed movement of the frame sequences 1a is not as desired when projected at the frame rate, the filmmaker may modify or redo the individual frame drawings until the desired result is attained. In the event that the individual frame drawings are embodied as video or data storage frames, the modification may be accomplished in real time during playback, such as by operation of a joy stick, as taught by the referenced U.S. Pat. No. 4,600,919, for example.

When the frame sequence 1a achieves the visual appearance of motion desired at the conventional frame projection rate, and does not have to be further edited, modified or redone, the same frame sequence of drawings is transferred onto transparencies, as seen in FIG. 5. The frame sequence may be traced by hand onto the transparencies, or by a xerographic recording process printed thereon as has been done since the 1950's by the Disney Corporation in the production of animated cartoons or by any other suitable transfer mechanism, such as a laser jet printer coupled to an animation computer. Alternatively, the line drawings of the object may be displayed via a transparent liquid crystal display device coupled to an animation computer of the type described in the referenced U.S. Pat. No. 4,600,919.

At any rate, the transparencies have an identical series of drawn characters 1e thereon, identical in every sense to the drawing series 1a. The transparencies may, for example, be made of transparent film, e.g. celluloid, and thus may be 'cels' such as are commonly used in the production of animated cartoons. The transparencies are provided with indexing means, such as the usual registration holes 8, to insure that all transparencies are registered in proper location on a jig 9 upon which they are subsequently placed for further steps in accordance with the method of the present invention.

Figure 6:
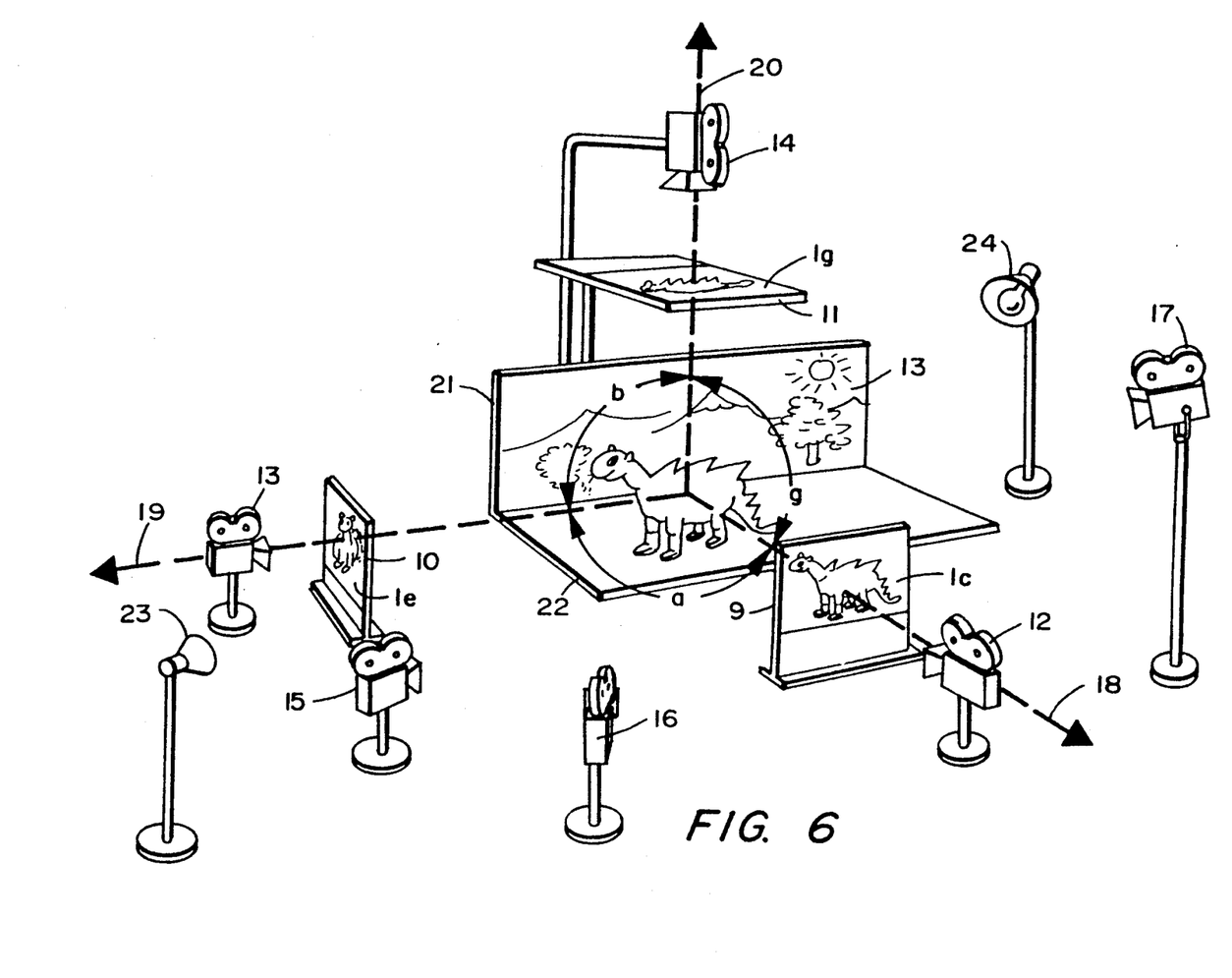
FIG. 6 is a diagrammatic perspective view showing 3 cameras viewing 3 jigs upon which rest transparencies describing the object's position. The FIG. 1 object is shown being posed in accordance and relation to the transparencies. Also shown in FIG. 6 are additional cameras not viewing jigs but only the posed object itself and the set upon which the object rests.

In accordance with the present invention, when multiple sets of transparencies are generated, as for use within the three dimensional arrangement depicted in FIG. 6, care must be taken by the filmmaker to be sure that the sequences of transparencies are and remain in synchronism. Careful drawing will assure that the sets correspond throughout the sequence. To assure the presence of synchronism, the filmmaker may display the sets simultaneously in real time, so that the drawings of e.g. the front, side, and top views of the object 1 are seen in proper proximity. The eye and brain of the filmmaker viewing the simultaneous display of the sequences then integrates the appearances in order to assure the presence of desired synchronism as well as desired motion in each dimension. Conveniently, the simultaneous three dimensional displays may be arranged so that the top view appears at the top of the display screen, the front view appears directly below the top view, and the left side view appears to the left of the front view, etc., much the same way as is the convention for three-view mechanical drawings. Each sequence of each set is then adjusted by the filmmaker in order to achieve the desired appearance of motion and synchronism.

The next step of the method is practiced with the set-up illustrated in FIG. 6. Each frame of the frame sequence 1e of transparency drawings is placed one by one onto a jig 9, the jig 9 being located between the animated puppet 1 and a viewer location or camera 12. The sequence of transparency drawings 1e on the jig 9 is utilized to align the position of the puppet 1 as one looks through the eyepiece of the camera 12 or other viewer, so that a smooth motion of the object is ultimately effected, a process that will be discussed in greater and more exacting detail later herein.

Before proceeding, I should describe the set-up pictorially illustrated in FIG. 6. In this figure we see the three dimensional static puppet 1 resting on a stage 22 with a scene backdrop 21, all of which is lit in a typical fashion by lights 23 and 24. We have already described how a sequence of transparency drawings with characters 1e are placed onto the jig 9 located between animated puppet 1 and viewer or camera 12. In the fashion described for the sequence 1e, another sequence 1f of transparencies with characters thereon is created, the transparencies having drawings of the characters 1f depicting the same movement of the puppet 1 as described by the transparencies of the sequence 1e. However, the transparency drawings 1f depict the character from an entirely different viewing angle or dimension "alpha" relative to the camera 12. The individual frames of the transparency drawing frame sequence 1f then are placed sequentially one by one onto a second jig 10, located between the animated puppet 1 and viewer or camera 13.

Yet another sequence of transparency drawings with characters 1g thereon is created, again depicting the various positions of the puppet 1 but from yet another viewing angle "gamma" relative to the camera 12; and, this third transparency sequence 1g is placed on a jig 11 located between animated puppet 1 and a viewer location or camera 14. The geometric relationship of these three viewers or cameras and jigs upon which rest the transparencies is illustrated by imaginary co-ordinate axes 18, 19, and 20 wherein the angle alpha is formed by the axes 18 and 19 and approximates 90 degrees and wherein the angle beta is framed by the axes 19 and 20, approximates 90 degrees and lies in a plane which is approximately normal to the plane including the angle alpha. Thus, a third angle, gamma, describes the 90 degree relationship between the axes 18 and 20. Other cameras, without transparency jigs may be stationed around the set at other viewing locations enabling them to photograph the puppet 1, the stage 22 upon which it rests, and the backdrop 21, such cameras being illustrated in FIG. 6 by reference numerals 15, 16, and 17.

Figure 7:
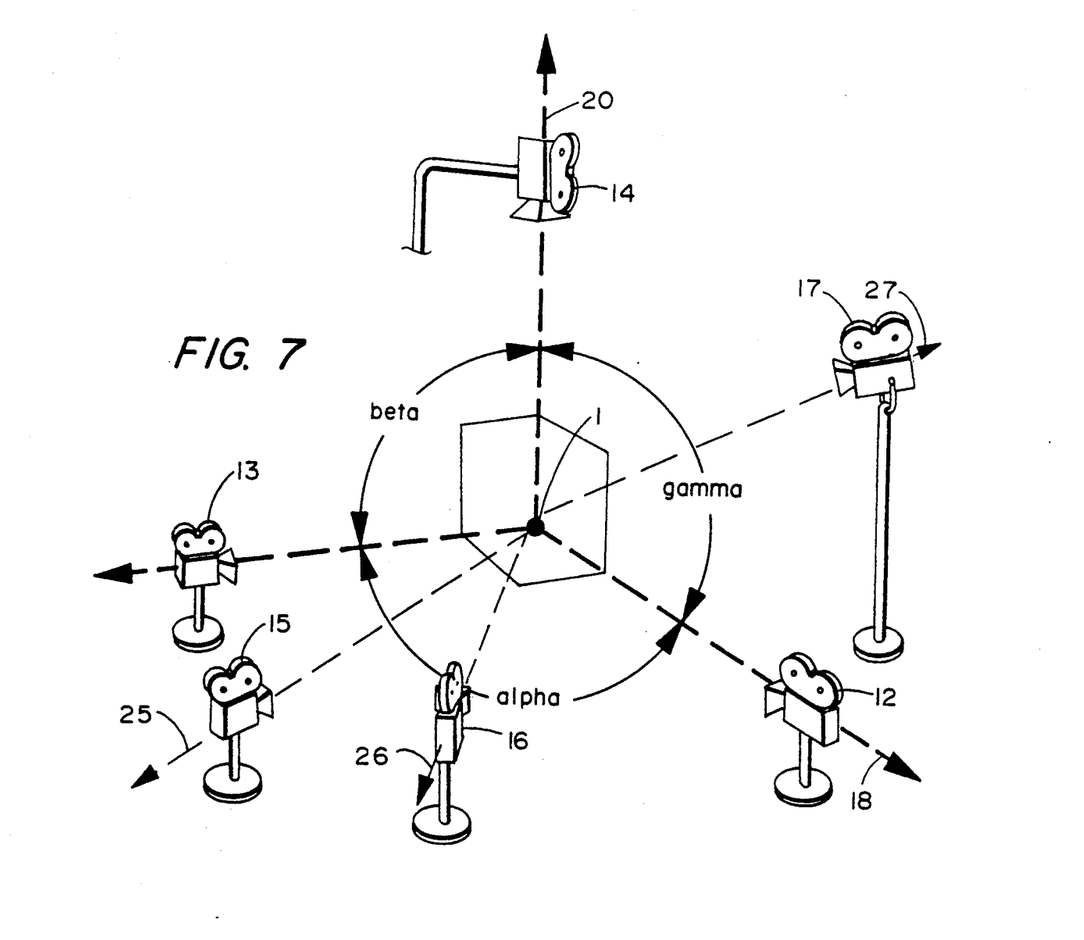
FIG. 7 is a diagrammatic perspective view corresponding to FIG. 6, and illustrates more precisely the geometric relationship between the cameras depicted in FIG. 6.

FIG. 7 illustrates more precisely the geometric relationship between the cameras described in FIG. 6 relative to a center of mass of the subject 1. What I want to specifically emphasize is the geometric relationship between the viewers or cameras with jigs, that is, viewers or cameras 12, 13, and 14. Looking closely at FIG. 7, it will be seen that the direction of viewer or camera 12, indicated by co-ordinate axis 18, is approximately perpendicular to the direction of viewer or camera 13, the latter direction being indicated by coordinate axis 19. Similarly, the direction of viewer or camera 14, illustrated by co-ordinate axis 20, is perpendicular or at a right angle beta to the direction of viewer or camera 13, said direction illustrated by co-ordinate axis 19. Additionally, the direction of viewer or camera 14, illustrated by the coordinate axis 20, is perpendicular or at a right angle gamma to the direction of viewer or camera 12, said direction illustrated by coordinate axis 18.

Thus, the direction of viewers or cameras 12, 13, and 14 are all generally perpendicular to one another within a three dimensional coordinate system and each camera is axially aligned with its associated jig and the puppet.

The reason for this arrangement can readily be explained. As the viewers or camera 12, 13 and 14 are all perpendicular to one another; so, too, are their corresponding jigs 9, 10, and 11. Further, the transparency drawings on the three jigs 9, 10 and 11 portray the object 1 from angles perpendicular to one another. Therefore, the position of the object 1 in each stage of movement is defined in three directions (from above (or below), and from two sides).

In this arrangement involving three generally perpendicular dimensions, the position of the object 1 in every frame is perfectly defined geometrically. Thus, with the described threedimensional arrangement the filmmaker may photograph the puppet and set from any conceivable angle, looking up or down, to the side, etc., and multiple cameras may be used to record the animation sequence. Camera 17 in FIG. 7, which looks down on the puppet I, is a typical example of one such camera and viewing angle. Of course, the filmmaker may also utilize the three cameras 12, 13, and 14 with their associated jigs 9, 10, and 11, so long as the transparencies positioned thereon for alignment of the object 1 in the three dimensions are removed before exposing each frame of the film.

If one wishes to photograph the puppet 1 by utilizing only two viewers or cameras with jigs, that is in the case in which the movement of the puppet 1 is defined in only two dimensions, one can photograph the puppet with cameras positioned only in the same plane as defined by the two perpendicular viewers or cameras with jigs, and not cameras positioned out of the plane, if one is to retain accuracy. For example, in the case in which one utilizes only viewers or camera 12 and 13 with jigs 9 and 10, one can only use cameras 15 and 1s in FIG. 7. The viewing locations of cameras 15 and 16, illustrated by axes 25 and 26 respectively, lie in the same plane defined by the direction of the generally perpendicularly aligned viewers or cameras 12 and 13, illustrated by axes 18 and 19 respectively. In a two-dimensional embodiment, the filmmaker could not utilize camera 17 whose direction illustrated by axis 27 clearly does not lie in the horizontal plane defined by the direction of perpendicular viewers or cameras 12 and 13; because the positions of the puppet 1 are not accurately defined at the viewing angle of the camera 17. Naturally, when shooting in two dimensions only the filmmaker can also utilize the cameras with jigs (in this case, cameras 12 and 13 and jigs 9 and 10) for photography purposes as long as one removes the transparencies from the jigs before exposing the film.

If, for whatever reason, the filmmaker wishes to photograph puppet 1 utilizing only one jig, that is, from only one viewing angle one can photograph the puppet 1 only with the camera positioned behind the single jig, and not from any other angle, in order to retain accuracy of desired motion. If, in FIG. 6 the artist only used jig 9 with camera 12, and not another jig arrangement, the only camera utilizable for photography purposes would be the camera 12. Any other camera angle may be inaccurate. A typical single viewing angle arrangement, using camera 12 as an example, would entail the steps of: first, placing transparency drawing 1e on jig 9; looking through the eyepiece of camera 12 and aligning the position of puppet 1 to that defined by each frame of the sequence 1e; then, removing transparency drawing 1f from the jig; exposing a single frame of film in camera 12 of the puppet 1; and repeating this process on a transparency to film frame basis, until the entire sequence 1e has been completed.

The filmmaker does not always need to use a camera with a jig arangement—one could easily use a viewer for alignment purposes just as well. In a three dimensional arrangement, as any conceivable angle is possible, all three jigs could easily have viewers behind them, with cameras positioned elsewhere for photographing the puppet 1. However, in the case of a single viewing angle arrangement, the filmmaker must position the camera, and not just the viewer, behind the single jig, as the single viewing angle is the only one useable in such an arrangement, in accordance with the principles of the present invention.

Figures 8, 9, 10:
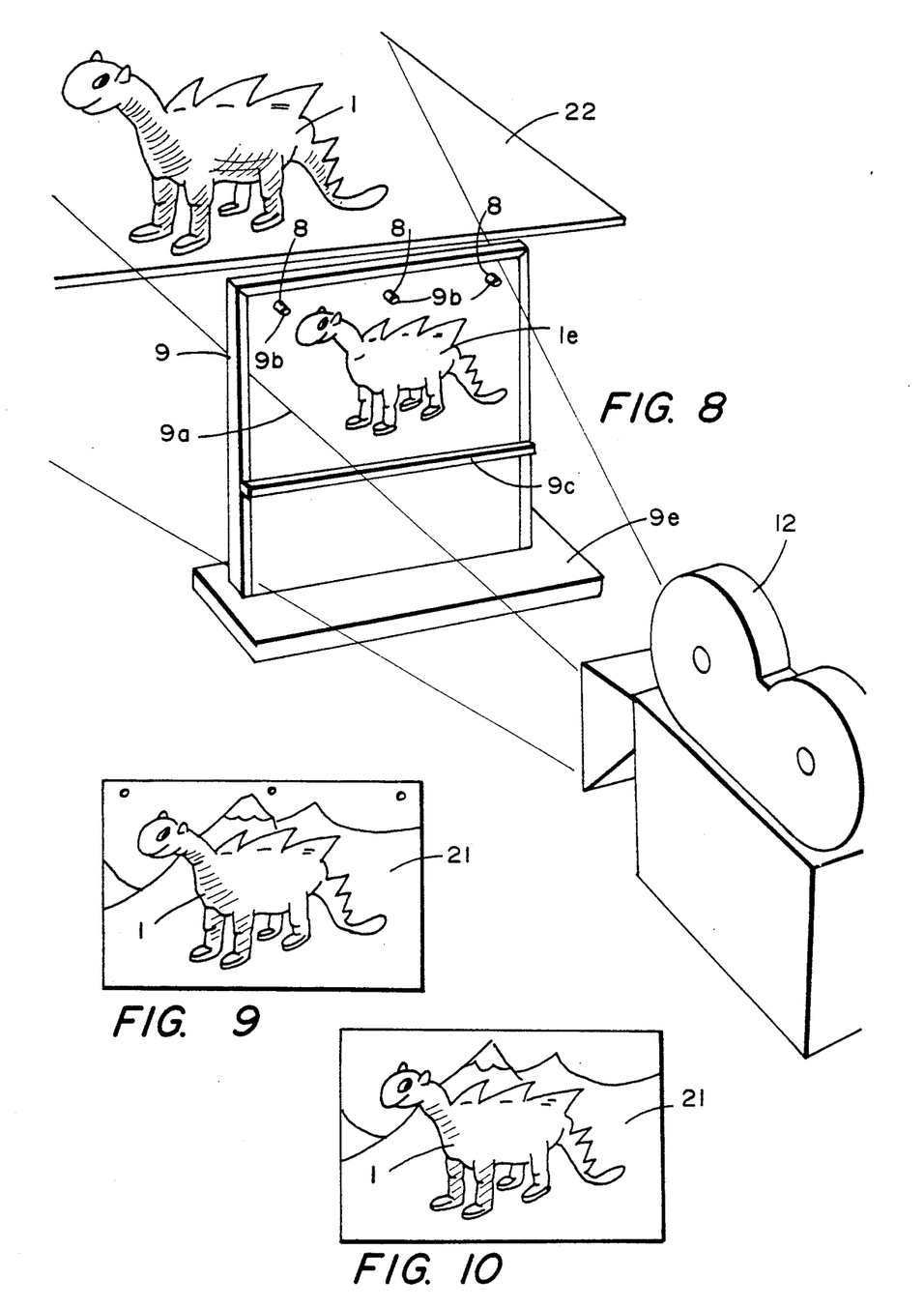
FIG. 8 is a closer view of a typical jig arrangement, showing in detail one camera and jig with one transparency and also showing the physical puppet or object posed to correspond with the drawing on the transparency.
FIG. 9 shows a typical view through the eyepiece of the FIG. 8 camera with both the transparency and the object visible in the camera's frame, the object posed in relation to the transparency drawing.
FIG. 10 is a view through the eyepiece of the FIG. 8 camera in which the transparency has been removed and only the object remains in the camera's field of view; the object being posed in the same relation to the removed transparency drawing shown in FIG. 9.

Moving now to FIG. 8, we can see in better detail a typical jig arrangement. Jig 9 is located between puppet 1 and viewer or camera 12, and the jig 9 is supported by two vertical posts 9d attached to a base 9e resting on the floor. Framed by the jig 9 is a sheet of glass 9a. The filmmaker attaches the top of the transparency frame of the sequence 1e onto the jig 9 by placing the three pegs 9b attached to the glass 9a through the three registration holes 8 of the transparency frame so that the transparency frame is flush with the glass 9a and so that the transparency is registered in proper position. To insure that the entire transparency 1e is flush with the glass 9a a small guard 9c at the bottom on the glass 9a presses upon transparency drawing 1e and glass 9a, the transparency drawing 1e being positioned between glass 9a and guard 9c. In this manner, then, each transparency drawing is attached to the jig 9 in proper registration and position relative to the object 1 and the camera 12. While I consider the arrangement described in FIG. 8 an excellent one, I certainly do not conceive it to be the only one possible, as a great many jigs with wide variations in design may be constructed and successfully used to practice my invention.

Moving to FIG. 9, once the transparency drawing 1e has been attached to the jig 9 by the means described, the filmmaker looks through the eyepiece of the viewer or camera in order to view the position of the puppet 1 in front of background 21 in relation to the transparency drawing 1e. FIG. 9 shows one such view of congruence through a viewer or camera. The legs, eyes, tail, etc. of the puppet 1 are then positioned by the filmmaker to conform to the lines of the transparency drawing 1e. Once the position of puppet 1 has been set to be congruent with the transparency drawing 1e, the transparency drawing 1e is removed from the jig 9. FIG. 10 is the same view through the camera eyepiece or a viewer as seen in FIG. 9; however, with the transparency drawing 1e removed and with only the puppet 1 and the background 21 in view. If the filmmaker were shooting from one viewing angle only, the filmmaker would photograph this FIG. 10 image. Of course, it should be noted that if the filmmaker were shooting in more than one dimension and utilizing viewers instead of cameras, it might not be necessary to remove the transparency drawing 1e from the jig 9, since it would not be seen as the view seen by the camera(s) doing the filming.

Once the puppet 1 has been correctly posed with respect to transparency image 1e, motion picture camera—which could be located in a variety of places depending on the number of viewing angles used—records the posed puppet 1 for the production of the finished film. The puppet 1 is then sequentially posed to follow the position drawn on the sequence of transparencies until the entire sequence 1e is completed.

Figures 11, 12, 13, 14:
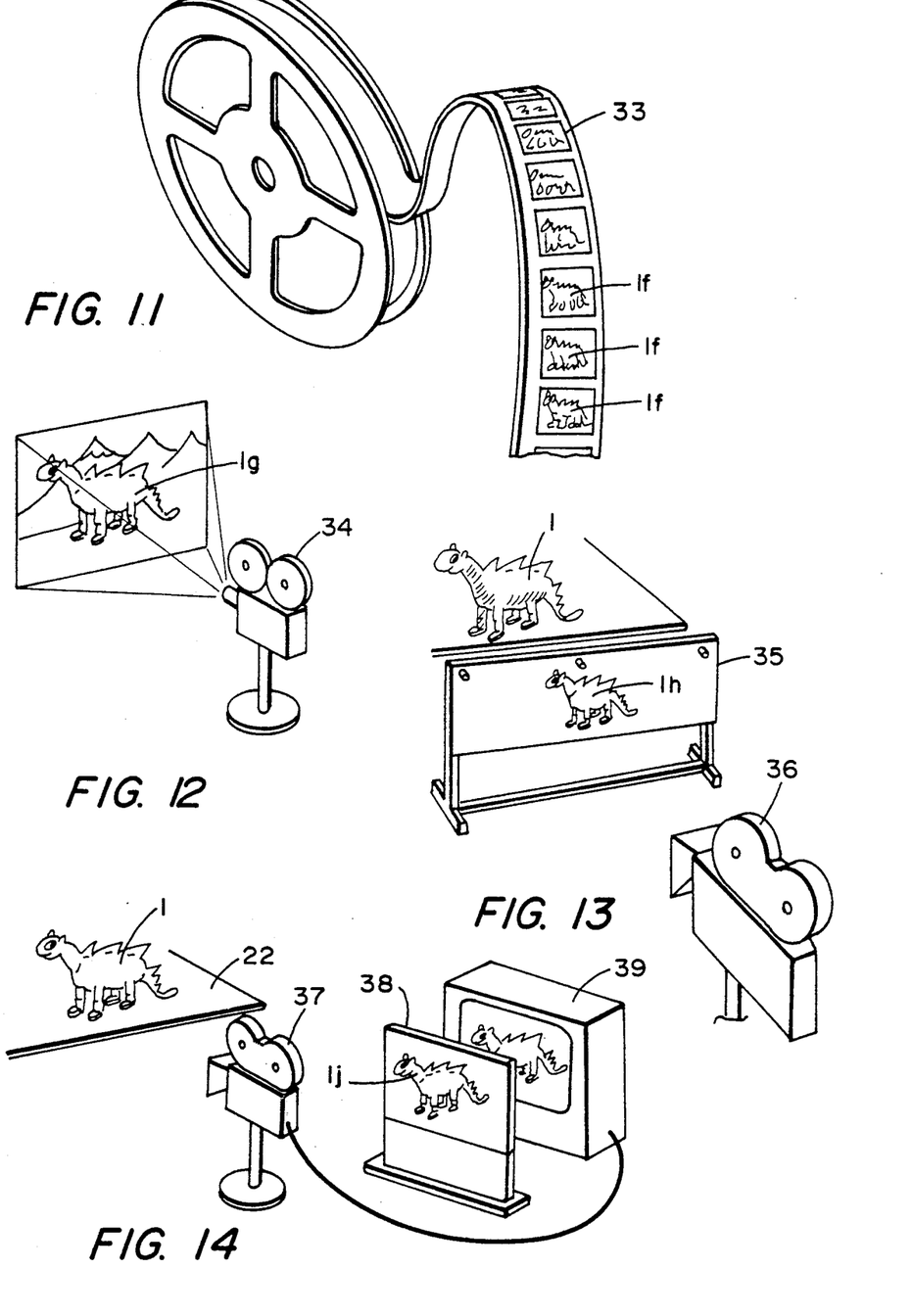
FIG. 11 is a view of a completed film ready for projection.
FIG. 12 pictorially illustrates a moving picture projector and the projected image of the three-dimensional animated object.
FIG. 13 shows a camera, puppet, and jig with a transparency which is three times the normal width.
FIG. 14 shows a puppet on a stage, a motion picture camera with a television camera located within the body of the motion picture camera, a video monitor displaying the image seen by the camera, and a jig with a transparency in front of the video monitor.

The picture frames produced by the stop motion camera 12 are then employed in the production of a finished film 33 embodying the finished puppet posed 1f of the animation sequence as shown in FIG. 11. In FIG. 12 the usual motion picture projector 34 is illustrated as projecting the animated motion 1g of the original physical puppet.

Before setting forth what is specifically claimed in this invention, brief mention should be made of the benefits and disadvantages of utilizing the method disclosed herein in one viewing angle, two viewing angles and three angles, with a brief discussion of how camera operations are performed in each.

If one utilizes this method with only one viewing angle, that is, utilizing only one jig and one camera, the advantage is obviously that it is cheaper and more economical than with two viewing angles or three viewing angles. One could easily imagine the producer of a low-budget stop-motion animation film utilizing this single angle method. The disadvantage of utilizing one angle is, of course, limited flexibility as one can only utilize a single camera and angle throughout the film's production.

Camera moves in one dimension are also more difficult than in two or three dimensions, but they can be accomplished. To illustrate how certain moves are effected, I have drawn in FIG. 13 a set-up with a jig 35 and transparency 1h between the puppet 1 and camera 36. The reader will note that for purposes of illustration, jig 35 is wider than normal and the transparency 1h is in fact three times wider than the normal transparency, though of the same height. To perform a camera movement commonly known as a pan, one will do the drawings upon the wide transparency 1h—the drawings will be able to move from one side of the transparency to the other —and one will pan the camera 36 incrementally as is commonly done in stop-motion while still retaining the drawn images in the field of the camera 36 (for the purpose of aligning the puppet's position). Such pan, of course, could not be accomplished with a transparency of normal width.

Similarly, to perform a camera movement known as a tilt, one wound employ a transpar that is not wider than normal but of greater height, thus retaining the draw image in the field of the camera while tilting the camera up or down. One may, the single viewing angle approach, also perform a camera function known as a zoom. To do so, one first creates the transparency drawings in the previously described fashion, assuming no zoom existed. However, one cannot use these drawings because as the jig is closer to the camera than the puppet, and as one incrementally zooms in, the transparency drawings become proportionally much larger than the puppet, rendering the drawings useless. To compensate, the drawings are incrementally reduced by any suitable scaling or photoreduction process, similar to that used by photocopy machines to reduce drawing sizes. (Of course, an enlargement of the drawings would be necessary if one zooms out). Such an arrangement requires a degree of planning, but it is certainly feasible. Similarly, a camera movement known as a dolly, in which the camera physically moves in the course of a scene, can be accomplished in a single dimension. However, a dolly move, unlike a zoom, always entails a change of perspective. Therefore, the filmmaker or artist responsible for the transparency drawings has to account for this camera movement in the production of the drawings. Therefore, he has to draw the object to be animated as becoming larger, smaller, etc., according to the planned dolly move. These drawings are then placed upon the jig. However, as the camera is physically moving in the course of the scene, and as the distance between the jig and the camera must remain constant for the drawings to remain effective, the jig has to be mounted to the camera by means that cause the distance between the camera and the jig (and transparency drawings thereon) to remain constant. Through such an arrangement any conceivable dolly movement in one dimension can be effected.

Having discussed this method in one-dimension, let us move on to two dimensions. If one utilizes the method in two-dimensions, that is, utilizing two jigs and cameras (or viewers) perpendicular to one another, there are numerous advantages. For one, there is much greater flexibility as one can use multiple cameras as long as they lie in the plane defined by the two viewing angles of the two jigs. And, while pans, tilts, zooms and dollies can be accomplished by the camera behind the jig using exactly the same techniques as just described for one dimension, the same camera moves can be accomplished by the cameras without jigs much more easily, as the cameras are not constrained positionally by the jigs. To perform a dolly, for example, one simply moves the camera incrementally as is commonly done in stop-motion animation. The disadvantage of employing the method in two-dimensions is that it is more expensive than one-dimension—the filmmaker makes twice as many drawings.

Utilizing the present method in three dimensions, that is, utilizing three jigs and cameras (or viewers) perpendicular to one another as shown in FIGS. 6 and 7, there are many advantages. Multiple cameras can photograph the puppet 1 from any viewing location or position. Considerable footage can be obtained from one scene, footage that may be used at different times in the finished film as the viewing angles are entirely different. Multiple angles also present the producer of the film with considerable choices as to which angle is the most dramatically effective (choices that a producer of a standard live-action film commonly has). And while one can pan, zoom, dolly and tilt with the cameras behind jigs using the same techniques described in onedimension, one can pan, zoom, dolly and tilt with the cameras without jigs relatively easily, giving the producer even more artistic latitude with regard to his creative options. The disadvantage of using the method in three dimensions is, of course, its cost. However, it is feasible if one considers the enormity of the budgets of such films as the Star Wars series (which utilized stop-motion animation extensively), budgets which have run into the tens of millions of dollars. Also, given the recent advances in computer animation technology, it is possible to produce drawings in three dimensions fairly cheaply and easily.

In the production of feature length films today, many motion picture cameras typically have television cameras within the body of the camera such that is possible to display on a video monitor precisely what the motion picture camera is viewing. FIG. 14 illustrates this arrangement. The puppet 1 resting on stage 22 is photographed by camera 37. Motion picture camera 37 has a video camera located within the body of the camera 37 such that a video display scheme typically enables the producer of the live-action film to see instantly on video tape a replay of the same scene that has been photographically recorded onto film.

It is possible to use the method heretofore described in connection with such an arrangement. Referring to FIG. 14, instead of placing jig 38 with transparency 1j between the puppet 1 and camera 37, as is typically the case in the use of the method, one instead places jig 38 with transparency 1j in front of video display monitor 39. (which is connected electronically to camera 37 by a typical cable 40). Then one poses the puppet 1 such that its image 1i displayed on video monitor 39 aligns with the position described by transparency drawing 1j. In this manner, then, one may pose the puppet 1 in the positions described by transparency drawings 1j and thereby achieve a desired movement of the puppet 1 in the completed film. With the FIG. 14 embodiment employing video monitors, it is entirely possible to define the movement of the puppet in one, two, and three dimensions as described earlier. All such previously discussed schemes with multi-dimensional representations and multiple cameras, etc., with pans, zooms, tilts and dollies would be possible using video technology. Alternatively, a computer graphics system, employing transparent liquid crystal display technology, may be used to replace the jigs.

It is also possible, using video technology, to eliminate the need for a jig and transparencies altogether. One first transfers the original drawings that have been selected onto videotape by recording them one by one, drawing by drawing, with a video camera. One then places this videotape, with all the sequentially recorded drawings, into a video recorder connected electronically to a monitor such as monitor 39 in FIG. 14 which also displays the image of the puppet seen by a motion picture camera. What one then does is to display a drawn image from the videotape and the image seen by the motion picture camera of the puppet simultaneously on the same video monitor, electronically superimposing the two images. One then is able to position the puppet on the stage such that its video image displayed on the monitor coincides with the drawn image from the videotape that is electronically superimposed on the same monitor This process is repeated until the sequence is completed.

From the above detailed description of the invention, then, it is believed that the construction and operation thereof will at once be apparent to those skilled in the art and it is to be understood that the above described embodiments of the invention are merely illustrative of the principle thereof and that numerous modifications and embodiments of the invention may be derived within the spirit and scope thereof.

What is claimed is:

1. A method for generating a stop frame animation sequence of a tangible, positionable, object comprising the steps of:

generating a sequence of likeness frames comprising a motion sequence of a likeness of the tangible object, transferring each frame of the likeness onto a tangible, 2-dimensional medium, separately positioning each likeness frame transferred to the tangible 2-dimension medium in order of the sequence and in predetermined registration such that, from the viewpoint of the recording means, the object may be positioned to become aligned with the features transferred to the tangible 2-dimension medium, positioning the object from the viewpoint of the recording means to align the object with the features of the likeness transferred to the tangible 2-dimensional medium, removing the tangible 2-dimensional medium once the object has been positioned, recording with the recording means upon a tangible means of expression a single frame of a scene including the positioned object, and repeating the displaying, positioning, and recording steps for each frame of the likeness thereby too generate the stop frame animation of the tangible object.

2. The method for generating a stop frame animation sequence as set forth in claim 1 wherein the step of generating a sequence of frames comprises the steps of drawing each likeness frame as an outline of the features of the object onto a drawing medium.

3. The method for generating a stop frame animation sequence as set forth in claim 1 wherein the steps of transferring each frame of the likeness to a tangible, 2-dimensional medium comprises the step of transferring each frame of the likeness to a transparency medium.

4. The method for generating a stop frame animation sequence as set forth in claim 3 wherein the step of positioning the transparency likeness comprises the steps of providing first registration alignment means on a transparency mounting means, providing second registration alignment means when the transparency medium is properly positioned, and aligning the second registration alignment means with the first registration alignment means thereby to mount the transparency medium inn proper position so that each likeness frame is located along the same axis as the object and the recording means.

5. The method for generating a stop frame animation sequence as set forth in claim 1 wherein the step of generating a sequence of likeness frames comprises the step of video recording individual frames of the sequence onto a video storage medium, and wherein the step of separately positioning each likeness frame transferred to a tangible, 2-dimensional medium in order of the sequence and in predetermined registration, comprises the steps of superimposing the recorded individual frame image on a single display screen and on the video recorded likeness frame, and wherein the step of positioning the object from the viewpoint of the recording means, the object and the likeness frame, and adjusting recording means, the object and the likeness frame, and adjusting the axially aligned object until the video image of the tangible object and the video image of the frame likeness are superimposed in coincidence on the screen.

6. The method for generating a stoop frame animation sequence as set forth in claim 1 wherein the step of transferring each likeness frame onto a tangible, 2-dimensional medium includes the step of transferring each frame of the likeness to a transparency, and wherein the step of separately positioning each likeness frame in order of the sequence and in predetermined registration comprises the step of superimposing the transparency upon a video display screen displaying a live video image of the object, and wherein the step of positioning the object from the viewpoint of the recording means comprises the steps of axially aligning the recording means, the transparency and the object, ad adjusting the axially aligned object until the live video image and the superimposed individual frame image are spatially coincident.

7. The method for generating a stop frame animation sequence as set forth in claim 1 wherein the step of generating a sequence of likeness frames includes the step of drawing each frame with the aid of a computer graphics system.

8. The method for generating a stop frame animation sequence as set forth in claim 1 wherein the step of generating a sequence of likeness frames comprises the step of forming each likeness frame directly onto a transparency medium.

9. A method for generating a stop frame animation sequence of a tangible, positionable object comprising the steps of:

generating plural simultaneous sequences of likeness frames comprising a motion sequence of an outline likeness of the object from plural viewing angles so that there is a likeness of the object from each viewing angle for a given position of the object, transferring each likeness frame of each sequence to a tangible,, 2-dimensional medium, separately positioning each likeness frame at each viewing angle and in order of the sequence and in predetermined registration, positioning the object to correspond to the position of the likeness of the object in the frames being displayed from each viewing angle, recording upon a tangible means of expression a single frame of a scene including the positioned object, and repeating the displaying, positioning, and recording steps for the plural corresponding frames of the likeness, thereby to generate the stop frame animation sequence of the tangible object.

10. The method for generating a stop frame animation sequence as set forth in claim 9 wherein the plural viewing angles comprise 3 viewing angles.

11. The method for generating a stop frame animation sequence as set forth in claim 10 wherein each viewing angle of the three is approximately perpendicular to the other 2 thereof and wherein each likeness frame is axially aligned with the object and a viewing point along each viewing angle.

12. The method for generating a stop frame animation sequence as set forth in claim 11 wherein the step of recording upon a tangible means of expression a single frame of a scene including the positioned object comprises the steps of positioning at least one recording means at any angle relative to the object thereby enabling zooming, panning and tilting operations without being constrained to the view obtainable at a said viewing angle.

* * * * *